United States Patent
Angione

(10) Patent No.: US 6,711,986 B2
(45) Date of Patent: Mar. 30, 2004

(54) DEVICE FOR COUPLING A LEVER TO A SHIFT CYLINDER PISTON

(75) Inventor: Pasquale Angione, Paris (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 10/089,407

(22) PCT Filed: Aug. 10, 2001

(86) PCT No.: PCT/FR01/02599
§ 371 (c)(1),
(2), (4) Date: Jul. 11, 2002

(87) PCT Pub. No.: WO02/14705
PCT Pub. Date: Feb. 21, 2002

(65) Prior Publication Data
US 2003/0029689 A1 Feb. 13, 2003

(51) Int. Cl.[7] .............................................. F16D 25/08
(52) U.S. Cl. ............................ 92/187; 92/256; 403/122
(58) Field of Search ..................... 92/187, 188, 189, 92/190, 255, 256, 257, 258, 259, 129; 403/122, 135, 136, 138

(56) References Cited

U.S. PATENT DOCUMENTS

| 3,173,266 A | * | 3/1965 | Shutt ............................ 92/187 |
| 3,854,557 A | * | 12/1974 | Wilcox ......................... 403/138 |
| 4,120,597 A | * | 10/1978 | Millard ......................... 403/138 |
| 4,650,363 A | * | 3/1987 | Kehl et al. ..................... 92/129 |
| 5,290,120 A | * | 3/1994 | Osterfeld et al. ............ 403/135 |
| 5,499,570 A | * | 3/1996 | Bergelin et al. ............. 403/133 |
| 5,758,986 A | * | 6/1998 | Kraps .......................... 403/138 |

FOREIGN PATENT DOCUMENTS

| EP | 0 664 405 A1 | 7/1995 |
| EP | 0 751 334 A1 | 1/1997 |
| GB | 2 235 961 A | 3/1991 |

* cited by examiner

Primary Examiner—Edward K. Look
Assistant Examiner—Thomas E. Lazo
(74) Attorney, Agent, or Firm—Liniak, Berenato & White

(57) ABSTRACT

A device having a rigid rod mobile in a translational and/or rotational movement, whereof one end penetrates inside a recess of a piston and is fixed by a swivel to the recess of the piston directly or via an insert. The insert is mounted inside the recess of the piston, with a mechanism for axially locking the rod or the insert relative to the piston. The locking mechanism includes a stop borne by the piston to provide axial locking along a direction corresponding to the mounting direction of the rod in the piston, and a washer borne by the insert or the rod. The washer has peripheral fins elastically deformable in the radial direction and is pressed against the inner wall of the recess of the piston by being deformed to lock the insert or the rod in the opposite direction.

15 Claims, 5 Drawing Sheets

DEVICE FOR COUPLING A LEVER TO A SHIFT CYLINDER PISTON

BACKGROUND OF THE INVENTION

1. Field of the Invention

This invention relates to a device for coupling a lever to the piston of a control cylinder.

The invention finds particular application in a hydraulic clutch cylinder in which a rod mounted on a ball element and movable in translation has to be able to displace a piston in alternating motion in one direction and then in another, without axially disconnecting the piston, all being sealed inside a body.

2. Discussion of the Related Art

Already known in this technical field is Swiss patent CH 404 318, which describes a coupling between a straight rod and a piston. For this purpose, the end of the rod is provided with a ball element which is nested in an insert mounted in a hollow portion of the piston. This ball element provides the coupling between the rod and the insert. In opposition to this knuckle joint, lugs of the insert are spaced out by seaming using a suitable tool, these lugs extending through an aperture formed in a transverse wall of the piston (which may for example separate a hollow chamber including a volume of oil from a chamber in which the insert and part of the rod are located). These lugs thus provide the coupling between the insert and the piston. The alternating straight line motion of the rod is therefore transmitted to the piston via the said insert which is fixed to both the piston and the rod.

Now, in this prior art, the coupling is not very satisfactory because excellent sealing has to be ensured at the transverse wall, since oil leaks must not take place. The seaming operation and the use of lugs which, once they have been bent back, are engaged against inclined surfaces of the said wall, does not provide such sealing.

In addition, the seaming operation adds an additional step to the assembly process, and can over time become less and less accurate (thus giving rise to problems of sealing as mentioned above). The seaming operation may damage the transverse wall of the piston, which is fragile.

Finally, it is necessary to avoid any machining or operations involving mechanical deformation (such as bending or seaming) of the piston, in particular if the latter is surface treated (for example anodised aluminium), because the layer which is formed could be damaged. It is therefore of course out of the question to envisage any coupling of the screw type, or the forming of any internal groove in the piston in which to mount a sleeve blocking straight line movement of the rod with respect to the piston.

Accordingly, it is in this context that the invention proposes to resolve at least some of these drawbacks.

SUMMARY OF THE INVENTION

To this end, there is proposed a device comprising:

a rigid rod movable in straight line and/or rotary motion and having one end which penetrates into the interior of a hollow portion of a piston, and which is fixed by means of a knuckle joint to the hollow portion of the piston directly or through an interposed insert, the said insert being accordingly mounted inside the hollow portion of the piston, and means for axial immobilisation of the insert or rod with respect to the piston, characterised in that the said immobilising means comprise an abutment carried by the piston to ensure axial immobilisation in a direction corresponding to the direction in which the rod is fitted in the piston, and a washer carried by the insert or rod, the said washer having radially elastically deformable peripheral fins which bear against the internal wall of the hollow portion of the piston by deforming in order to ensure immobilisation of the insert or rod in the opposite direction.

Preferably, the abutment will consist of a solid transverse partition wall against which the insert or rod bears once fitted, the said partition wall separating the hollow portion of the piston from a chamber which can contain a hydraulic liquid, the lugs of the washer will define a cone and will extend radially from a central crown portion of opposite conicity, and the washer will be disposed in the hollow portion of the piston in such a way that the conicity of the lugs opposes withdrawal of the rod.

According to further features of the device:

- the insert will be able to comprise at least one rigid sleeve fixed on one side to the ball element of the rod and having means for receiving the washer and holding it in position.
- the sleeve will be arranged to co-operate, in opposition to the knuckle joint, with an intermediate member for positioning and maintaining the washer with respect to the insert, or with a preform projecting from a solid transverse wall of the piston.
- the sleeve will therefore, in particular, be able to have, in opposition to the knuckle joint, a skirt with radially elastically deformable lugs, the said skirt being formed with an external groove for receiving the washer, the skirt being adapted to be connected around the intermediate member or the preform, in such a way as to retain the washer radially and axially in position around the said skirt of the insert, at the level of the said groove. In accordance with a complementary aspect, the skirt will be able to be provided with a reinforcing internal core, and the intermediate member or the preform will be adapted to be inserted between the core and the said skirt.
- in an alternative arrangement, the sleeve will also be able to be provided with an aperture in opposition to the knuckle joint, and a projecting portion of the intermediate member or preform will then be able to cooperate with the said aperture in such a way as to maintain the washer radially and axially in position between the sleeve and the intermediate member or preform, at the level of an external shoulder of the said sleeve.
- in accordance with another possibility, the sleeve will preferably be provided with an open ended hole opposite the knuckle joint, and the intermediate member will then be provided with a skirt having radially elastically deformable lugs, the said skirt being provided at its end with hook means of a clip type in cooperation with the open ended hole of the sleeve, whereby to retain the washer axially in place between the sleeve and the intermediate member, at the level of an external shoulder of the latter.
- in accordance with yet another embodiment, the sleeve will have, in opposition to the knuckle joint, a substantially spherical hollow zone in cooperation with a projecting element which is also substantially spherical and which is part of the intermediate member, whereby to couple the sleeve to the intermediate member by means of a knuckle joint, the washer being then interposed and blocked between the sleeve and the said intermediate member, at the level of a shoulder of the intermediate member.

The invention also relates to a hydraulic clutch cylinder for a motor vehicle comprising a device of the kind described above.

BRIEF DESCRIPTION OF THE DRAWINGS

The invention will be understood more clearly, and further features, details and advantages of it will appear more clearly, on a reading of the following description which is given by way of example and with reference to the attached drawings, in which.

DETAILED DESCRIPTION OF THE PREFERRED EMBODIMENTS

In the following description, those elements which are identical, similar or analogous will be designated by the same reference signs.

Figure 1:
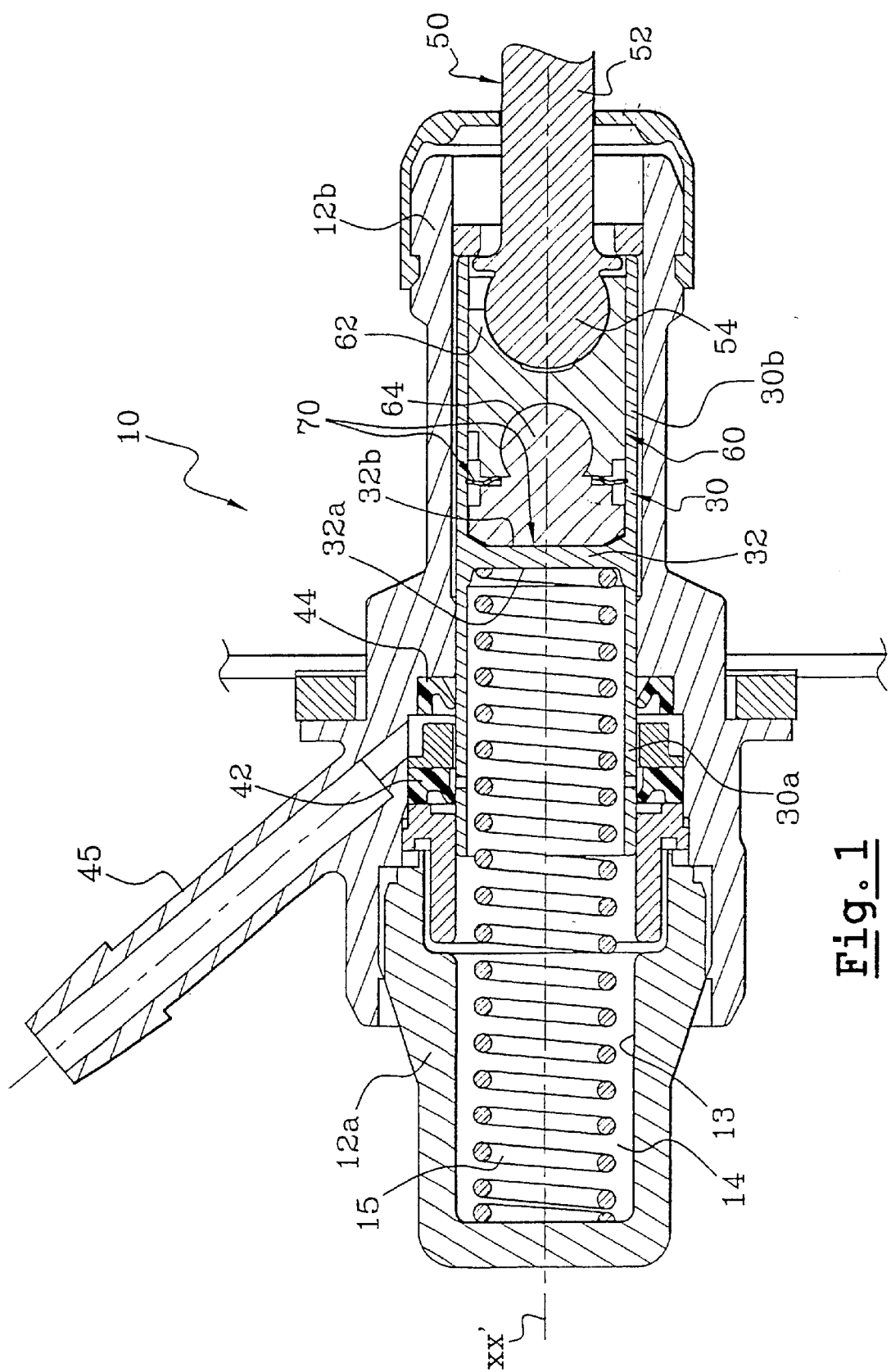
FIG. 1 is a view in longitudinal cross section of a clutch operating cylinder comprising a device in accordance with the invention.

FIG. 1 shows an operating cylinder for the hydraulic control of a motor vehicle clutch.

The operating cylinder includes a piston which is movable axially within a cylinder body to delimit a variable volume hydraulic chamber. A connecting orifice, on which a duct of a receiver cylinder (not shown) is connected, is open into the hydraulic chamber.

The operating cylinder includes a piston rod which is connected for example to a clutch pedal operated by the driver, or an actuator which is operated in accordance with predetermined programmes. The piston of the operating cylinder is arranged to expel a fluid such as oil contained in the hydraulic chamber, towards the duct that connects the operating cylinder to the receiver cylinder.

The cylinder 10 is shown in the drawings in its delivery (static) position. It comprises a tubular cylindrical body 12 in two parts, namely a front part 12a and a rear part 12b, which are both preferably made separately, for example by moulding in plastic materials. The body 12 has an internal bore 13 with an axis xx' which defines, in the front of the cylinder, a variable volume hydraulic chamber 14. The bore 13, and therefore the body 12, is open into the rear part 12b.

A piston 30 is arranged for sealed, axial sliding movement in the body of the cylinder 10, from the rear forwards starting in the retracted or declutching position shown in FIG. 1, to a forward or clutch engaged position (not shown). A helical return spring 15 is located in the hydraulic chamber against the base of the front part 12a of the body on one side, and against a front face 32a of a transverse partition wall 32 of the piston, this wall dividing the piston 30 into two parts, namely a front part 30a and a rear part 30b.

The hydraulic chamber 14 is filled with oil, so that it is necessary to provide perfect sealing between this chamber, the piston and the rear part of the cylinder. For this purpose, two lip seals 42 and 44 are arranged between the rear part 12b of the cylinder and the front part 30a of the piston. A tube 45 connects the hydraulic chamber to a main feed reservoir (not shown) which is arranged outside the cylinder 10.

The piston 30 consists essentially of the front and rear parts divided by the transverse partition wall 32, which lies in a radial plane at right angles to the general axis xx'. This avoids any sealing problems between the two parts of the piston. To this end, the partition wall is formed integrally with the body of the piston. In order to make a component 30 of low thickness in aluminium, and at reduced manufacturing cost, the piston is formed by a cold impact deep drawing operation. This known technique enables a partitioned tubular component which also has high dimensional precision and a satisfactory surface condition to be made in high quantity production at low cost. It is afterwards anodised to guarantee a good surface state, in particular on the external surface because it slides in the plastics body and rubs against the lip seals. For more detail, reference can be made to patent application FR 99 07111 filed by the Applicant.

As can be seen in FIGS. 1 to 4, the device 10 in accordance with the invention comprises the piston 30 described above, a rigid rod 50, which is for example made of metal and which is connected to an insert 60 which is itself connected to the piston by coupling means 70. We will now describe each of these elements, and modified versions thereof.

Accordingly, in FIGS. 1 to 4 it can be noted that the rod 50 has a straight portion 52 terminated at one end by a male spherical portion 54 which is inserted in the piston 30, (as is part of the straight rod). This spherical portion, which is for example machined in the solid, is inserted into a complementary female form (which is accordingly hollow) formed in the insert 60, and in particular in a rear portion 62b of a sleeve 62 of the insert 60. The cooperation of the spherical male portion 54 and the spherical female portion 62b gives a coupling of the knuckle type between the rod 50 and the insert 60, once the said components have been fitted in the piston 30.

The insert 60 also includes, in this particular embodiment, an intermediate member 64 which is disposed further forward in the piston 30, in particular against the rear face 32b of the transverse partition wall of the piston when assembly has been completed. This intermediate member 64 is connected to the sleeve 62 by a knuckle joint 62a/64b similar to that which couples the rod 50 to the sleeve 62.

Means 70 for axially immobilising the insert 60 to the piston, and therefore in particular its intermediate portion 64, are also provided. In this example they take the form of a rear abutment 32 which prevents axial movement of the insert (and therefore of the rod) with respect to the piston in a first direction, together with a washer 72 which immobilises the insert with respect to the piston in the opposite direction.

Figure 3:
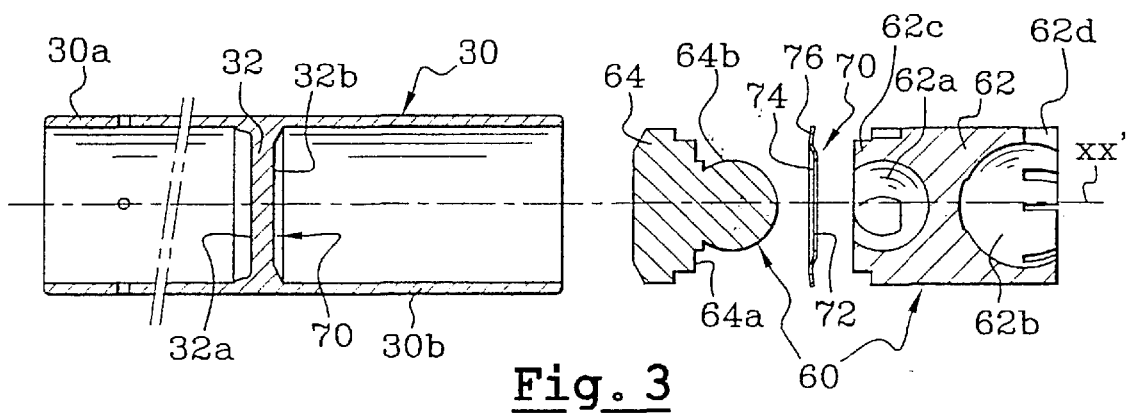
FIG. 3 is a simplified and exploded detail view of FIG. 1, with the main elements of the device.
Figure 4:
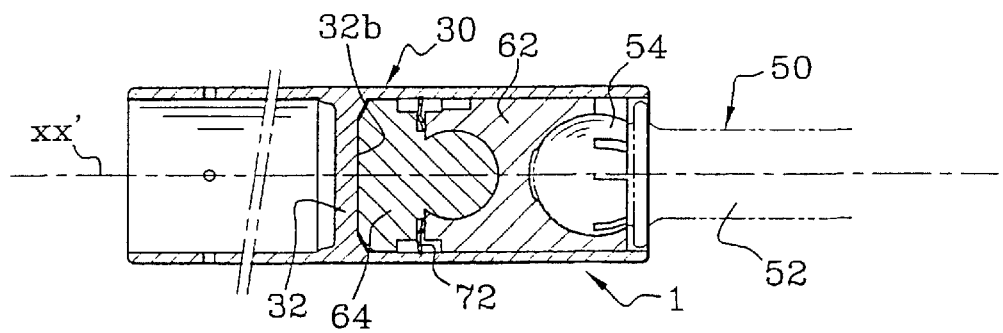
FIG. 4 is a view similar to FIG. 3, with the elements in their fitted position.

This washer defines a general plane at right angles to the axis xx', and a conical central crown portion 74 from which there project peripheral lugs 76 which are inclined with respect to the general plane of the washer, these lugs defining a cone with a small cone angle which is inverse to the cone angle of the crown (see FIG. 3 in particular).

The device 10 in accordance with the invention therefore comprises the piston 30, the rigid rod 50, the insert 60 and the means 70 for axially immobilising the assembly thereby created.

Assembly of this device is quite simple. It is considered that the piston is fitted in its chamber, although that is not necessary. The washer 72 is placed around a shoulder 64a of the intermediate member 64. The sleeve 62 is placed around the ball element 64b of the intermediate member, so that it traps the washer between them (radially elastically deformable lugs 62c will be arranged in the sleeve so that the knuckle joint can be correctly assembled). The rod is inserted in the other part of the sleeve using the other knuckle joint (radially elastically deformable lugs 62d will again be arranged on the rear part of the sleeve—see FIG. 2). Once this assembly has been made, it is inserted into the piston in such a way that the intermediate member comes into abutment against the rear face 32b of the transverse partition wall 32 of the piston (see FIG. 1 or 4).

The operation is of course carried out in such a way that the washer 72 is placed in the correct orientation, that is to say the conicity of the lugs, once the washer is fitted, make it impossible to withdraw the rod from the piston. Thus, when a thrust is exerted on the rod (declutching), the latter pushes the piston forward in a movement which follows a perfectly straight line. During the clutch engaging operation, the spring exerts a thrust on the piston, which in its turn pushes the rod. The forces produced by the transverse wall 32 of the piston on the intermediate member are transmitted to the washer. The washer tends to deform under stress, causing its elastically radially deformable lugs to be stiffened (this is facilitated by the reverse conicity of the central crown portion), so that the lugs in their turn exert a radial centrifugal force on the internal wall of the piston, thereby preventing any axial displacement of the latter (no axial clearance is possible). This radial stiffening effect is produced even on a smooth surface like that of the piston, and this happens once an axial tractive force is exerted on the washer. Similarly, if a pulling force is exerted on the rod 30, an identical effect occurs in the region of the washer 72, by virtue of the sleeve 62 and intermediate member 64, between which the washer is sandwiched. It is therefore impossible to "unstick" the intermediate member from the transverse partition wall of the piston. The coupling is such that it is impossible to displace the rod axially towards the rear without displacing the piston.

Figure 2:
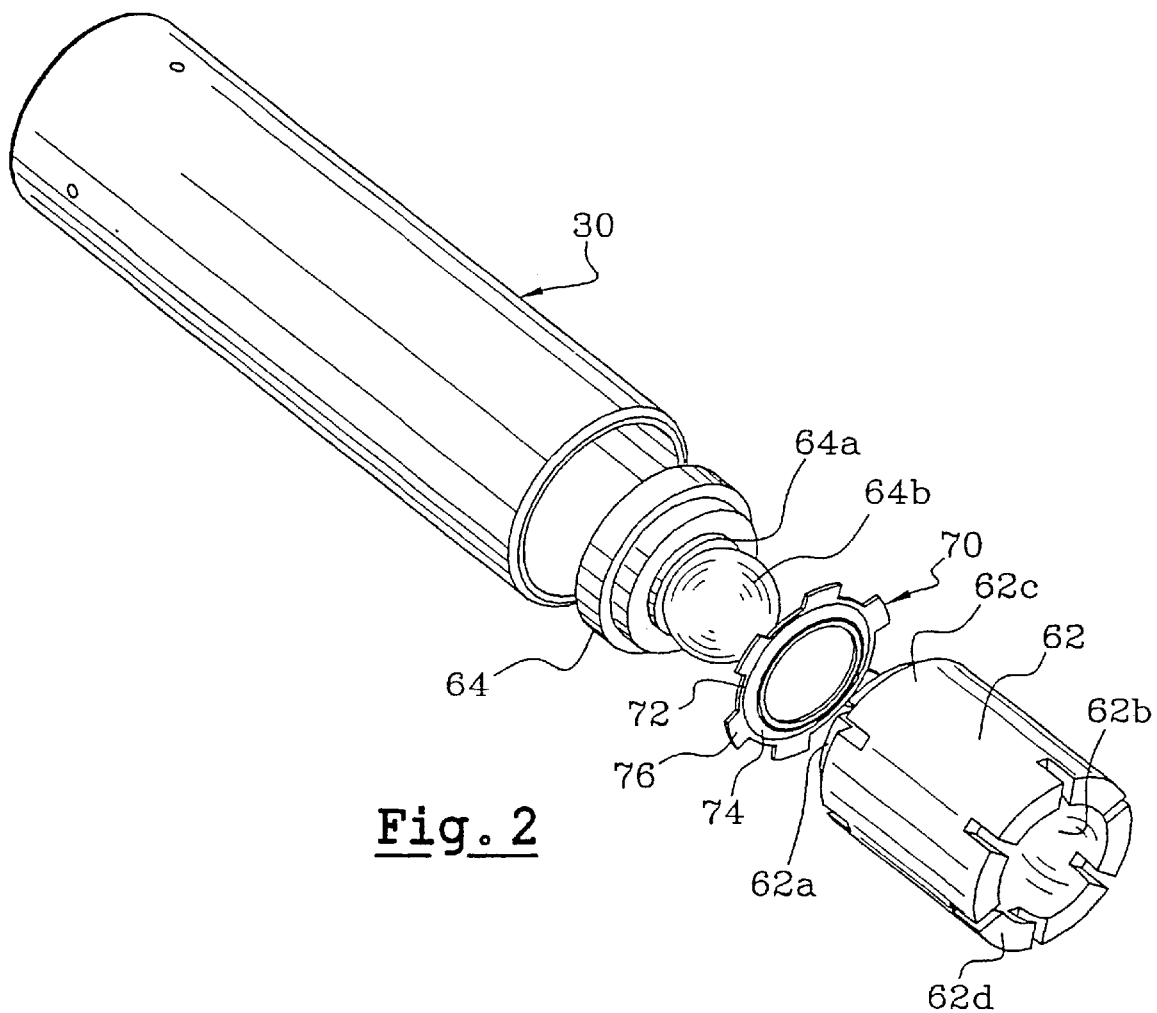
FIG. 2 is a perspective view on FIG. 1.

FIG. 2 shows the arrangement of FIG. 1 seen in perspective. It shows how the rigid solid rod is trapped by its ball element within the corresponding "female" portion of the sleeve, by the resilient lugs 62c. It can also be seen how the coupling between the sleeve and the intermediate member is made, and the Figure also shows the position of the washer between these two components.

Figure 5:
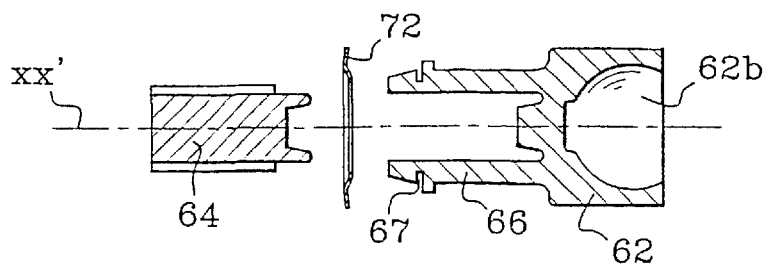
FIG. 5 is a modified version.

In a further embodiment shown in FIG. 5, the coupling between the sleeve 62 and the intermediate member 64 is no longer achieved by means of a knuckle joint (as in FIGS. 1 to 4), but by means of an axial skirt 66 with slender lugs which are elastically deformable radially, the skirt being formed with an external groove 67 within which the washer 72 fits. The insertion of the skirt 67 around the intermediate member has the effect of preventing the lugs of the skirt from moving radially inwards, which could lead to disengagement of the washer. Thus, the intermediate member exerts a slight radial pressure on the washer 72, which is thereby held against the internal wall of the hollow rear part 30b of the piston 30, as well as in the groove 67 of the sleeve 62.

Figure 6:
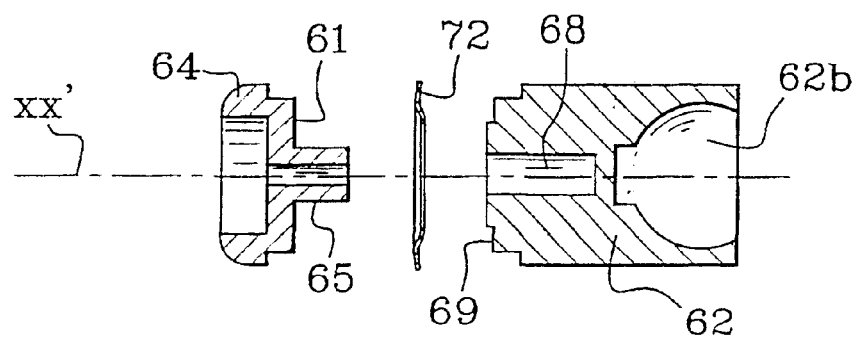
FIG. 6 is another modified version.

In FIG. 6, the sleeve 62 is this time formed with a blind hole 68, inside which a thin projecting portion 65 of the intermediate member 64 is coupled in various possible ways, for example by force-fitting, adhesive bonding, screwing, snap-fitting, welding (by laser or ultrasonically); or otherwise. A washer 72 is fitted between the sleeve 62 and the intermediate member 64, around a small shoulder 69 formed at the end of the sleeve, and inside a large shoulder 61 on the second part. Once fitted, the washer is sandwiched between the sleeve 62 and the intermediate member 64.

Figure 7:
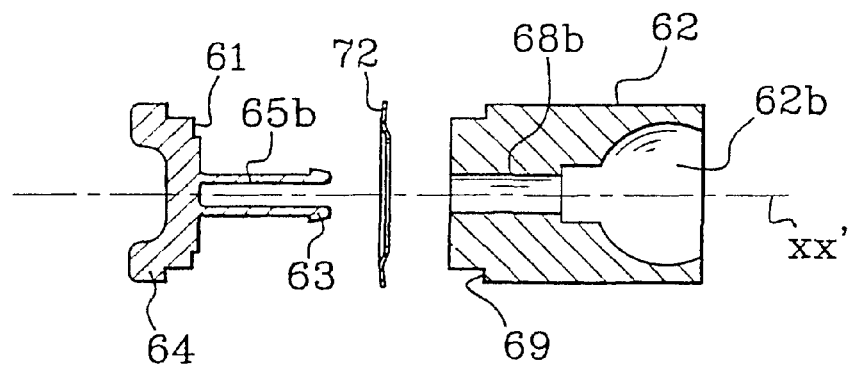
FIG. 7 is another modified version.

In FIG. 7, which is a variant on FIG. 6, the projecting portion 65 of the intermediate member 64 is in the form of a skirt 65b with elastically radially deformable lugs, which is provided at its end with a shoulder and a sharp increase in diameter followed by a chamfer, so as to form a sort of hook or clip 63. This skirt 65b is inserted in an open ended hole 68b in the sleeve 62, so as to trap the washer 72 between the sleeve 62 and the intermediate member 64 at the level of a shoulder 61 of the said intermediate member 64. This avoids the need to have recourse to a joint of the type consisting of a weld, or force-fitting or adhesive bonding as mentioned above.

Figure 8:
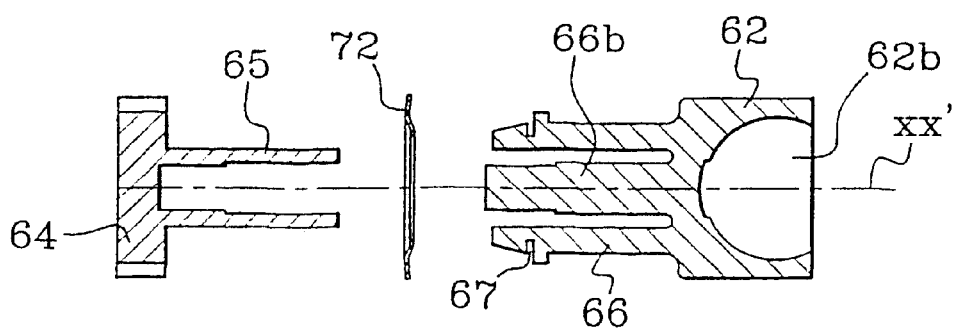
FIG. 8 is another modified version.

In FIG. 8, the sleeve 62 is terminated by a skirt 66 similar to that in FIG. 5, with radially elastically deformable lugs, but it has in addition an internal reinforcing portion in the form of a solid core 66b. The core 66b has a length slightly greater than that of the lugs of the skirt 66. In this way, the force from the clutch pedal is transmitted to the piston 30 through this core without using the slender lugs of the skirt, which avoids the addition of stresses on those parts.

In a complementary manner, if the retention of the washer 72 by a groove 67 is not sufficient, the intermediate member 64, which includes a projecting portion 65 in the form of a skirt with a slender wall such that it can be inserted between the skirt 66 and the central core 66b of the sleeve 62, is added. As in solution 2, the washer 72 is fitted in the groove 67 of the skirt 66 of the sleeve 62, the said skirt being held radially spaced away after the intermediate member 64 has been introduced, so as to give proper retention of the washer 72.

Figure 9:
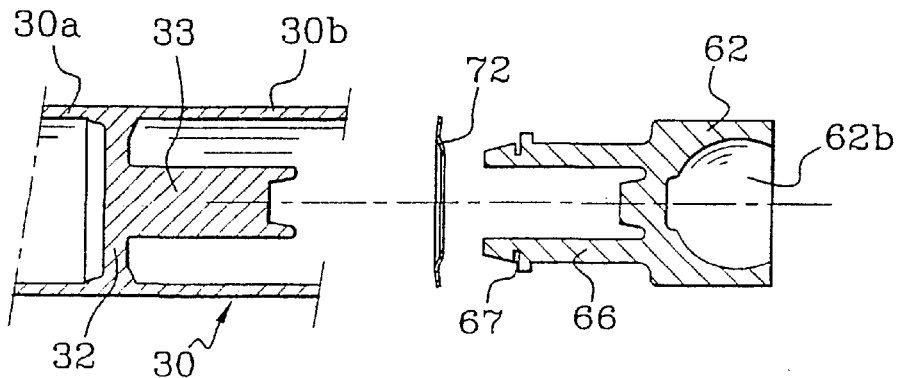
FIG. 9 is another modified version.

In FIG. 9, which is a variant on FIGS. 5 and 6, the intermediate member is replaced by a preform 33 which is formed directly in the transverse partition wall 32 of the piston 30 (again by impact deep drawing). This preform 33 comes into cooperation with the sleeve 62 during introduction of the sleeve 62 into the hollow rear part 30b, so that it holds the skirt of the sleeve with its radially elastically deformable slender lugs spaced out. The advantage of this solution is that it reduces the number of components, because the insert 60 no longer consists of anything but the sleeve 62. In addition, there is no point in making any major modifications to the piston, and in particular, the latter is not machined in such a way as to reduce its mechanical properties, especially if it is made of anodised aluminium as mentioned above. In the case shown, the preform has a conical inlet and holds the skirt 66 spaced away from the sleeve 62.

Figure 10:
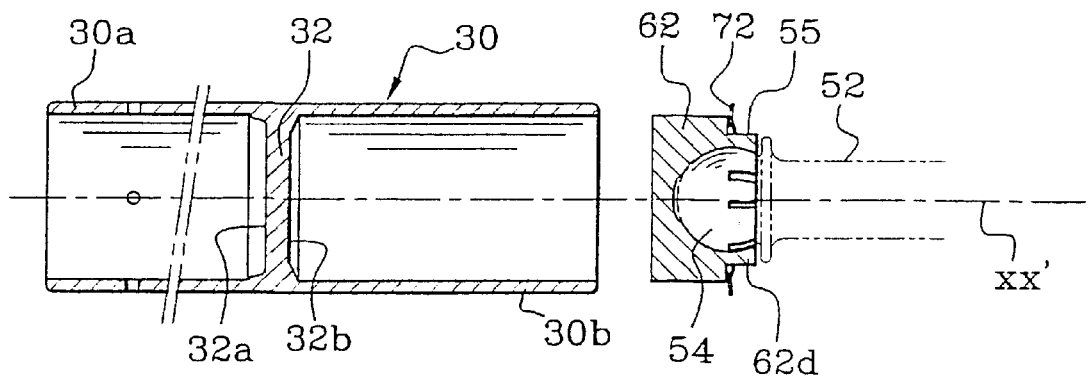
FIG. 10 is another modified version.

In FIG. 10, the washer 72 is mounted directly around the ball element 54 of the rigid rod 50. It could in particular be mounted around a shoulder 55 formed in the radially resiliently deformable lugs 62d of the sleeve 62. This solution also avoids the need to make use of two separate components in order to form the insert 60. The sleeve 62 is also simplified overall because it no longer has two knuckle joints, nor does it have any hole (either blind or open ended), nor does it have a skirt with a radially resiliently deformable wall, but just a single spherical cavity 62b coupling it with the rod 50. Once the sleeve has been mounted in the base of the piston, against the transverse partition wall 32, the rod 50 is fixed with respect to the piston and its displacement causes the piston to be displaced without any axial play.

In another version, the sleeve 62 could be made in one piece, with resilient lugs 62b for assembly of the knuckle joint, and by carrying out an in situ moulding operation in a synthetic material on the washer 72 which has been placed beforehand within the mould. This form of the method, as compared with the foregoing one, enables the washer 72 to be displaced towards the partition wall 32, without the fitting of the washer being limited by the external diameter of the lugs 62d, while at the same time it ensures a sufficiently strong axial support.

Since the washer 72 has lugs 76 on its periphery for stop purposes in the piston 30, it is necessary to leave them with some axial elasticity so that they can deflect in that direction whereby to ensure the axial blocking function. Some material is therefore to be removed on either side of these tongues, along the axis of the component.

Figure 11:
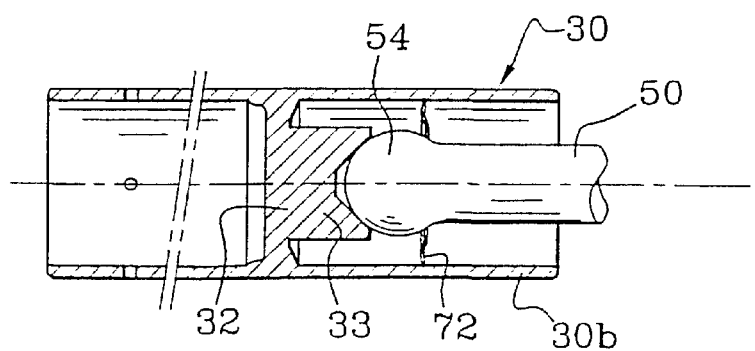
FIG. 11 is another modified version.

In addition, it is relevant, in the interests of simplifying the mould and reducing costs, not to make use of a withdrawable or removable piece in the mould, and to make it only in two pieces. In order to achieve the required form without "counter stripping", longitudinal grooves are provided in line with the lugs 76 and having the same cross section as the latter, extending over the whole length of the sleeve 62. Centring of the sleeve in the piston 30 remains ensured by the material located between these grooves. In FIG. 11, the rod 50 is coupled directly to the hollow part 30b in the piston 30 through the spherical male portion 54 of the said rod and a conical surface which is formed (still by cold impact drawing) in the preform 33 of the transverse partition wall 32.

A washer 72 is placed directly around the male portion 54 of the rod before it is fitted in the hollow portion of the piston 30. In addition, the conical surface acts as an axial abutment in the direction of fitting of the rod, and the washer prevents the said rod being withdrawn in the opposite direction.

More precisely, the washer is mounted behind the male portion 54 and remains in place in particular by virtue of its conical central crown portion 74.

The rod and all of the elements which effect the coupling between the latter and the piston (and therefore the washer and the insert in particular) are so adapted that they can resist a tractive force of at least 30 DaN, both in static conditions (during transport of the device for assembly purposes), and dynamic conditions (in operation in a clutch for example). The solutions shown are thus adapted for the reliable transmission of instantaneous forces resulting from rapid use, for example during rapid release of the clutch pedal.

It should of course be understood, however, that these examples are given only to illustrate the object of the invention, and that in no way do they constitute any limitation of the latter.

The invention can indeed be applied in numerous fields, in which there is any question of coupling a rod mounted on a piston to which there must be transmitted alternating straight line motion. For example, this may be a clutch mechanism, controlled or otherwise, of the pull-to-release or push-to-release type. It may again relate to braking apparatus, distributors for hydraulic control systems, and all hydraulic systems which are controlled by an operator or by an actuator.

What is claimed is:

1. A device (10) comprising:

a rigid rod (50) movable in straight line and a rotary motion and having one end which penetrates into an interior of a hollow portion (30b) of a piston (30), and which is fixed by means of a knuckle joint to the hollow portion (30b) of the piston (30) by one of a direct connection and an indirect connection through an interposed insert (60), said insert being accordingly mounted inside the hollow portion (30b) of the piston (30), and means (70) for axial immobilisation of one of the insert (60) and rod (50) with respect to the piston (30), wherein said immobilising means (70) includes an abutment (32) carried by the piston (30) to ensure axial immobilisation in a direction corresponding to a direction in which the rod is fitted in the piston, and a washer (72) carried by one of the insert (60) and rod (50), said washer (72) having radially elastically deformable peripheral lugs (76) which bear against an internal wall of the hollow portion (30b) of the piston (30) by deforming in order to ensure immobilisation of one of the insert and rod in an opposite direction.

2. A device according to claim 1, wherein:

the abutment (32) includes a solid transverse partition wall (32) against which one of the insert (60) and rod (50) bears once fitted, said partition wall (32) separating the hollow portion (30b) of the piston (30) from a chamber (30a) which can contain a hydraulic liquid, the lugs (76) of the washer define a cone and extend radially from a central crown portion (74) of opposite conicity, and the washer (72) is disposed in the hollow portion of the piston in such a way that the conicity of the lugs opposes withdrawal of the rod.

3. A device according to claim 1, characterised in that the insert (60) comprises at least one rigid sleeve (62) fixed on one side to the ball element (54) of the rod (50) and having means (55; 66, 67, 69) for receiving the washer (72) and holding it in position.

4. A device according to claim 3, characterised in that the sleeve (62) is in cooperation, in opposition to the knuckle joint (54/62b), with an intermediate member (64) for positioning and maintaining the washer with respect to the insert (60).

5. A device according to claim 4, characterised in that the sleeve (62) has, in opposition to the knuckle joint (54, 62b), a skirt (66) which is provided with radially elastically deformable lugs, said skirt being formed with an external groove (67) for receiving the washer (72), the skirt (66) being able to one of be inserted around an intermediate member (64) and preform (33), in such a way as to retain the washer radially and axially in position around said skirt of the insert, at the level of the said groove (67).

6. A device according to claim 5, characterised in that the skirt (66) is provided with a reinforcing internal core (66b) having a length greater than that of the skirt, one of the intermediate member and preform (33) being adapted to be inserted between the core (62b) and said skirt (66).

7. A device according to claim 4, characterised in that the sleeve (62) is provided with an open ended hole (68b) opposite the knuckle joint (54, 62b), and the intermediate member (64) is provided with a skirt (65b) having radially elastically deformable lugs, said skirt (65b) being provided at its end with hook means (63) of a clip type in cooperation with the open ended hole (68b) of the sleeve (62), whereby to retain the washer axially in place between the sleeve and the intermediate member, at the level of an external shoulder (61) of the latter.

8. A device according to claim 4, characterised in that the sleeve (62) has, in opposition to the knuckle joint (54, 62b), a substantially spherical hollow zone (62a) in cooperation with a projecting element (64b) which is also substantially spherical and which is part of the intermediate member (64), whereby to couple the sleeve (62) to the intermediate member by means of a knuckle joint, the washer (72) being then interposed and blocked between the sleeve (62) and said intermediate member (64), at the level of a shoulder (64a) of the intermediate member (64).

9. A device according to claim 3, characterised in that the sleeve (62) is in cooperation, in opposition to the knuckle joint (55, 62b), with a preform (33) projecting from a solid transverse wall (32) of the piston (30), in such a way as to position and retain the washer (72) around said insert.

10. A device according to claim 9, characterised in that the sleeve (62) is provided with an aperture (68) in opposition to the knuckle joint (54, 62b), and one of a projecting portion (65) of the intermediate member (64) and preform (33) is in cooperation with said aperture (68) in such a way as to maintain the washer radially and axially in position between the sleeve (62) and one of the intermediate member (64) and preform (33), at the level of an external shoulder (69) of the said sleeve (62).

11. A device according to claim 3, characterised in that the insert is a single member consisting of the sleeve (62) on which the washer (72) is moulded.

12. A device according to claim 11, characterised in that longitudinal grooves are provided in line with the lugs (76) of the washer (72) on the perimeter of the sleeve (62).

13. A device according to claim 1, characterised in that the washer (72) is placed directly around a spherical portion (54) of the rod (50) which serves as a male portion of the knuckle joint with the piston (30).

14. A device according to claim 1, characterised in that the washer (72) is mounted around an insert coupled to the rod by means of a knuckle joint.

15. A hydraulic clutch cylinder (10) for a motor vehicle, in combination with the device according to claim 1.

* * * * *